United States Patent [19]
Jensen et al.

[11] Patent Number: 5,598,080
[45] Date of Patent: Jan. 28, 1997

[54] STARTING DEVICE FOR A SINGLE-PHASE INDUCTION MOTOR

[75] Inventors: Niels D. Jensen, Bjerringbro; Jørgen Daugbjerg, Ulstrup, both of Denmark

[73] Assignee: Grundfos A/S, Bjerringbro, Denmark

[21] Appl. No.: 17,211

[22] Filed: Feb. 12, 1993

[30] Foreign Application Priority Data

Feb. 14, 1992 [DE] Germany .................... 42 04 323.9
May 9, 1992 [DE] Germany .................... 42 15 263.1

[51] Int. Cl.$^6$ .................................................. H02P 5/34
[52] U.S. Cl. ........................ 318/794; 318/788; 318/785
[58] Field of Search ................................. 318/616, 787, 318/729, 781, 778, 785, 786, 254, 816, 817, 795, 793, 138, 784, 794; 323/210

[56] References Cited

U.S. PATENT DOCUMENTS

| | | | |
|---|---|---|---|
| 3,763,913 | 10/1973 | Wattenbarger | 323/86 |
| 4,119,894 | 10/1978 | Sorensen | 318/778 |
| 4,119,895 | 10/1978 | Müller | 318/254 |
| 4,280,085 | 7/1981 | Cutler et al. | 318/803 |
| 4,300,081 | 11/1981 | Van Landingham | 318/616 |
| 4,463,304 | 7/1984 | Miller | 318/786 |
| 4,567,424 | 1/1986 | Dobsa et al. | 323/210 |
| 4,604,563 | 8/1986 | Min | 318/785 |
| 4,651,077 | 3/1987 | Woyski | 318/787 |
| 4,654,551 | 3/1987 | Farr | 310/112 |
| 4,670,697 | 6/1987 | Wrege et al. | 318/786 |
| 4,672,289 | 6/1987 | Ghosh et al. | 318/817 |
| 4,672,290 | 6/1987 | Ghosh et al. | 318/817 |
| 4,719,399 | 1/1988 | Wrege | 318/794 |
| 4,757,171 | 7/1988 | Cornell | 219/10.55 R |
| 4,786,850 | 11/1988 | Chmiel | 318/785 |
| 4,809,148 | 2/1989 | Barn | 363/20 |
| 4,853,569 | 8/1989 | Lewus | 318/795 |
| 5,013,154 | 4/1992 | Dropps et al. | 318/778 |
| 5,017,853 | 5/1991 | Chmiel | 318/786 |
| 5,041,771 | 8/1991 | Min | 318/786 |
| 5,200,684 | 4/1993 | Fisher | 318/729 |
| 5,302,885 | 4/1994 | Schwarz et al. | 318/781 |

FOREIGN PATENT DOCUMENTS 462932  11/1968  Switzerland .
738159  10/1955  United Kingdom .

*Primary Examiner*—John W. Cabeca
*Attorney, Agent, or Firm*—Panitch Schwarze Jacobs & Nadel, P.C.

[57] ABSTRACT

The single-phase induction motor has a starting device which is activated during the start-up phase of the motor and exposes at least a part of the motor coil to a voltage which changes temporarily, the average value of the voltage formed during one period of oscillation not being equal to zero.

4 Claims, 3 Drawing Sheets

5,598,080

STARTING DEVICE FOR A SINGLE-PHASE INDUCTION MOTOR

BACKGROUND OF THE INVENTION a) Field of the Invention

The invention relates to a single-phase induction motor with a starting device.

b) Description of the Prior Art

Motors of this type are used today in numerous areas, for example for driving heating pumps and submerged pumps, for driving compressors and other units. They are operated using alternating current and are essentially intended for low capacities. In the simplest form, single-phase induction motors are neither self-starting nor dependent on direction of rotation. However, in practice both are generally required, which is why a starting device is provided. This determines not only the direction of rotation, but also produces a starting moment. In the simplest form, this starting device comprises an auxiliary coil provided in the support, to which a capacitor is connected in series. This starting device is connected in parallel to the support coil.

In a refined embodiment, at least one part of the actual starting device can be switched off after reaching a predetermined rotational speed in most cases by means of a centrifugal switch. When switching off, as a rule the capacitor capacitance existing at the auxiliary coil is reduced. This technology is known, reference is made to it, for example in SIHI-HALBERG, Grundlagen für die Planung von Kreiselpumpenanlagen (Fundamental principles for planning centrifugal pump installations), 1978, pages 186 and 187.

Known starting devices operate independently of whether or not they are switched off completely or partially when reaching the nominal rotational speed, so that an approximately uniform starting torque rotating with the rotor is produced when starting the motor. The characteristics of the relative magnetic flux of stator and rotor are represented as ellipses arranged essentially symmetrically about the zero point. In terms of construction, starting devices of this type can be realised according to the state of the art by connecting capacitors next to the auxiliary coil which is required anyway. Capacitors are comparatively expensive components and occupy an increasing amount of space with increasing capacitance.

Starting from this, the object of the invention is to provide an alternative starting device which can be constructed more favourably using other electronic components.

SUMMARY OF THE INVENTION

This object is achieved according to the invention in that during the start-up phase of the motor the starting device exposes at least one part of the motor coil to a voltage which changes temporarily, the average value thereof formed during one period of oscillation (of the supply voltage) not being equal to zero. It is clear that according to the invention the motor is controlled during the start-up phase using a voltage, the temporary average value of which is controlled intentionally to not be equal to zero. The variations conventionally present due to inequalities within the supply network and which on precise inspection also lead to an average voltage value which is not equal to zero, can be neglected and are not adequate for this specific motor control.

The invention can be used both for starting devices which run continuously and for those which are switched off completely or partially after reaching a predetermined rotational speed. So that the average value of the voltage which changes temporarily and exists at at least one part of the motor coil is not equal to zero, the characteristics of the relative flux in the stator and in the rotor are displaced away from the zero point, wherein the measure of the displacement is a function of the average value of the previously mentioned voltage. This results in the starting moment no longer being uniform and it may even be reversed for a short time. The extent of the maximum moment is thus increased to two to three times the conventional value. Running of at least one part of the motor coil at a voltage, the average value of which is not equal to zero, does however have the same effect as that of a large capacitance connected in series with the auxiliary coil as regards the starting process. Moreover, the starting moment may be chosen by selection, arrangement and dimensions of the electronic components, so that a reversal of moment not only takes place, but the moment returns to the zero value if need be for a fraction of a period of oscillation.

The advantage of the solution according to the invention lies in the fact that in the simplest form the starting device only requires one further rectifier element next to an auxiliary coil, and this rectifier element is available cheaply and compactly in the form of a diode. In a preferred embodiment therefore, the starting device has at least one rectifier element which is superimposed on at least one part of the motor coil during the start-up phase. There are numerous possibilities for connecting this rectifier element, hence it may be connected, for example in parallel or in series to the auxiliary coil or a part of the auxiliary coil.

Preferably, the rectifier element is deactivated after reaching a predetermined rotational speed or after a certain time.

The starting device of the invention operates independently of whether or not the auxiliary coil remains in superimposed connection with a running capacitor during operation of the motor to increase the breakdown torque and the nominal power.

BRIEF DESCRIPTION OF THE DRAWINGS

The foregoing summary of the invention, as well as the following detailed description of the preferred embodiments, will be better understood when read in conjunction with the appended drawings. For the purposes of illustrating the invention, there are shown in the drawings embodiments which are presently preferred, it being understood, however, that the invention is not limited to the specific arrangements and instrumentalities disclosed. In the drawings.

DESCRIPTION OF THE PREFERRED EMBODIMENTS

Figure 1:
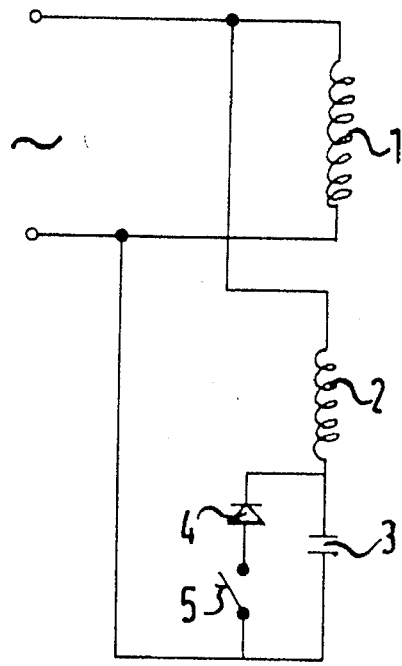
FIGS. 1 and 2 show by way of example two circuit arrangements with the starting device of the invention.
Figure 2:
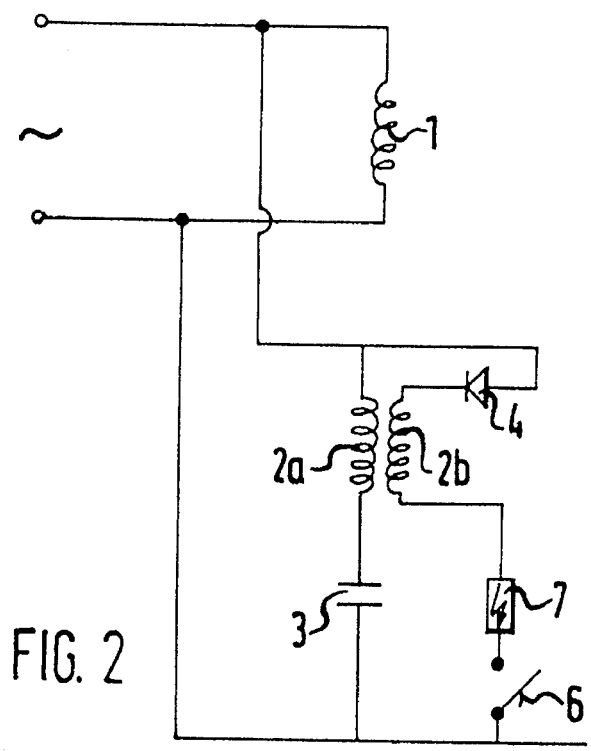

The main stator coil of the single-phase induction motor is designated 1 in each case in FIGS. 1 and 2. The auxiliary coil connected in parallel thereto—often also termed the starting coil—is designated 2. An auxiliary coil, to which an inductively coupled further auxiliary coil 2b is assigned, is termed 2a. Here the auxiliary coil 2 thus comprises two parallel auxiliary coils 2a and 2b.

The single-phase induction motor shown using FIG. 1 has a main coil 1 in a manner known per se, to which an auxiliary coil 2 in series with a running capacitor 3 lies in parallel. The coil 2 and the capacitor 3 remain superimposed during the entire motor operation and ensure increased nominal capacity of the motor during operation. A diode 4, which lies in series with a centrifugal switch 5, is connected in parallel with the running capacitor 3 to start the motor. When starting the motor, the diode 4 and the centrifugal switch 5 as well as the starting coil 2 form the actual starting device. If the motor has reached a predetermined rotational speed, for example two thirds of the nominal rotational speed, the centrifugal switch 5 opens into the switch position shown in FIG. 1, after which the starting device is deactivated.

The capacitor 3 and the auxiliary coil 2 are indeed required in practice for starting the motor, namely so that the direction of rotation is determined, but do not belong to the actual starting device. The diode 4 replaces the further capacitor conventionally connected for the purpose of starting in the state of the art. A further resistance (not shown) in series or further electronic components may optionally be connected to the diode 4 to adjust the relative flux characteristic or the moment course in the required manner.

In the circuit shown using FIG. 2, the auxiliary coil 2a lies in series with the running capacitor 3 and in parallel with the main stator coil 1. A switch 6, which then connects a resistance 7, a further auxiliary coil 2b and a diode 4 one behind another in series, in parallel to the main stator coil 1, is closed to start the motor. The further auxiliary coil 2b is inductively coupled to the first auxiliary coil 2a. The switch 6 is controlled by means of a bimetallic member, that is to say, after a certain time it operates due to its heat produced by the current flux. The heat produced within the motor then ensures that the switch 6 does not return to its original position after the switching process, rather only when the motor has cooled down and is to be started again. The switch 5 or a time switch may also be used instead of the switch 6.

During normal motor operation, as is known from the state of the art, the motor is also exposed to an alternating voltage in the start-up phase, the frequency of which may optionally be varied by means of a frequency converter. The average value of the supply voltage during one period of oscillation is however always zero. A relative magnetic flux is then produced in the stator of the motor, as is shown using the characteristic 8 in FIG. 3. Such characteristics are typically ellipses arranged symmetrically about the zero point 9.

A rotor flux characteristic, which represents the relative magnetic flux of the rotor during one motor revolution, belongs to each stator flux characteristic. Such rotor flux characteristics typically lie within the associated stator flux characteristic and are not shown in FIGS. 3 and 4 for reasons of clarity. They also behave in similar manner to the stator flux characteristics. If the voltage existing at a part of one or more coils is set to a temporary average value which is not equal to zero, the shape of the characteristic of the relative magnetic flux on the one hand and its position with respect to the zero point 9 changes. Two further characteristics 10 and 11, which show the relative magnetic stator flux during one motor revolution when the temporary average value of the existing voltage is not equal to zero, are shown by way of example in FIG. 3.

Whereas the characteristic 10 is essentially displaced from the coordinate zero point 9 by an amount $X_{10}$, the shape of the characteristic 11 is also still clearly altered. It is displaced with respect to the zero point 9 by the amount $X_{11}$. This distance X, at which the characteristics 10 and 11 are removed from the original characteristic 8, in particular from the zero point 9, is a function of the temporary average value of the voltage $U_m$ superimposed on the auxiliary coil 2. That is to say, the greater this distance X, the greater also the temporary average value of this voltage.

The momentary magnetic flux within the stator and the rotor is in each case determined by a vector starting from the zero point 9, the peak of this vector lying on the stator flux characteristic or the rotor flux characteristic (not shown). A changing angle α lies between these two vectors. The torque being produced between rotor and stator is a function of the cross product of these two vectors or of the amounts given by the length of the vectors and of the angle α fixed by them. It is clear from this that the maximum moment of the motor also grows with increasing distance X. Two vectors $V_9$ and $V_{11}$ are drawn in for this purpose by way of example.

Figure 3:
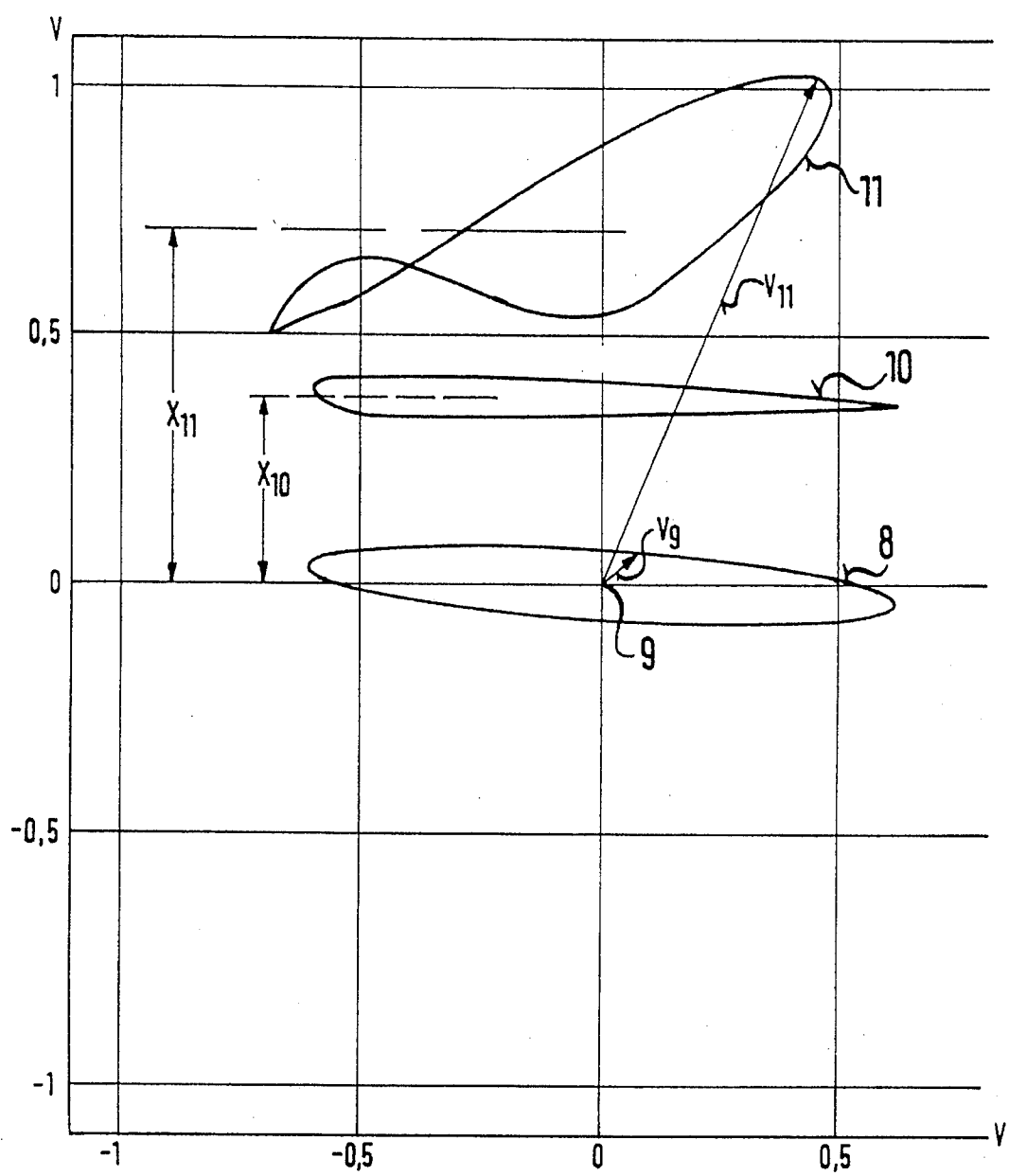
FIG. 3 shows a diagram which represents the relative stator flux during one rotor revolution at three different average voltage values.
Figure 4:
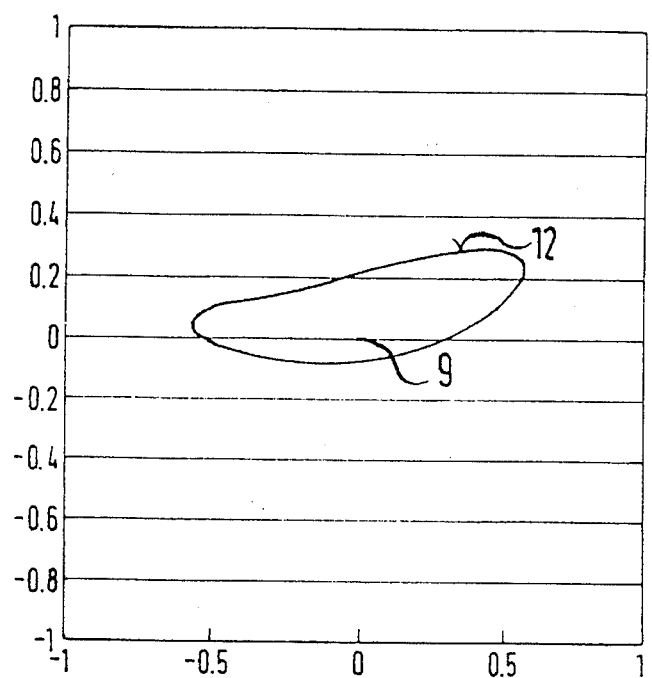
FIG. 4 shows a relative stator flux diagram, the characteristic of which still just includes the zero point.
Figure 5:
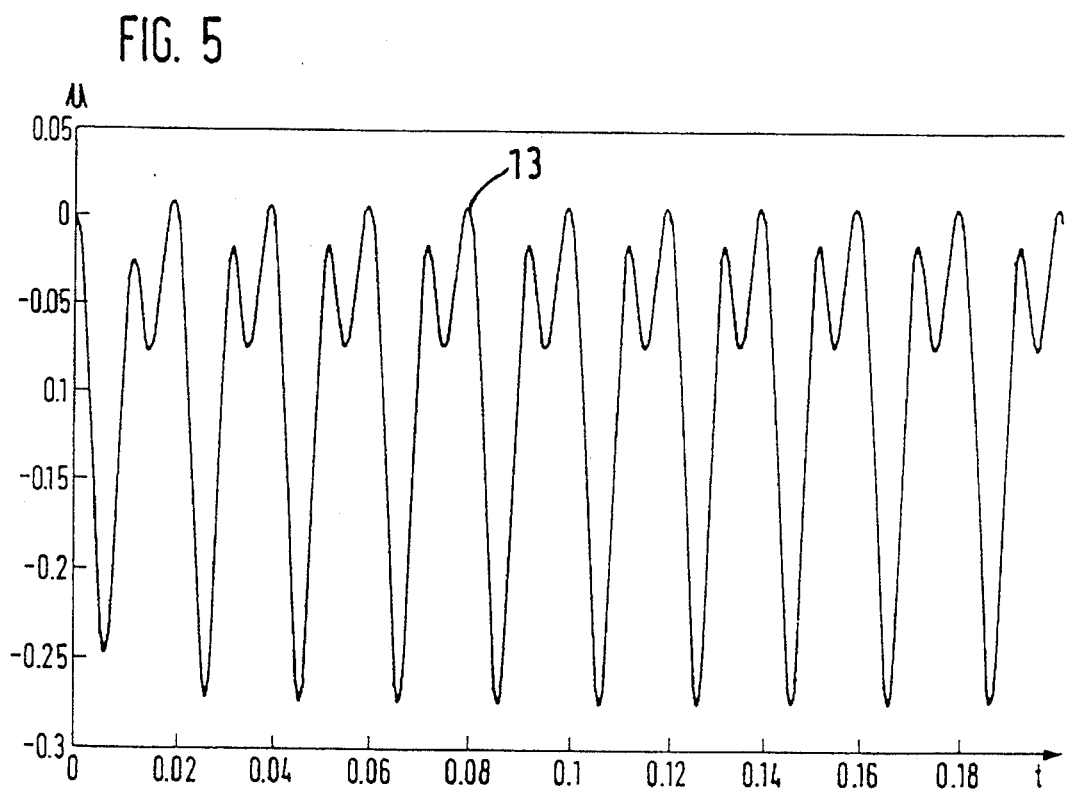
FIG. 5 shows the temporary moment course which is produced for a stator flux according to FIG. 4.

Whereas for the stator flux characteristics according to numbers 10 and 11 in FIG. 3, the moment not only changes its quantity but also its direction, the starting device, the effect of which is shown using FIGS. 4 and 5, is adjusted so that the stator flux characteristic 12 still just includes the zero point 9, and this ensures that the temporary moment course of the motor is always greater or smaller (depending on the direction of rotation) than zero. A moment course 13 of this type is shown in FIG. 5. The high moment peaks can be seen clearly which not only ensure that one particularly high torque is available for starting at least for a short time, which is advantageous, for example for the rotor is stuck, but that this moment also still pulsates so that a certain vibrating effect is achieved, which makes starting possible even under unfavourable conditions. If after reaching a predetermined rotational speed or after a predetermined time, the starting device is then deactivated, a stator flux characteristic is produced which is arranged symmetrically to the zero point 9, as is conventional.

The present invention may be embodied in other specific forms without departing from the spirit or essential attributes thereof and, accordingly, reference should be made to the appended claims rather than to the foregoing specification as indicating the scope of the invention.

We claim:

1. A single phase induction motor comprising:

a motor coil;

a first auxiliary coil connected in parallel with the motor coil;

a capacitor connected in series with the first auxiliary coil; and a starting device comprising a rectifier element, a resistance element, a second auxiliary coil inductively coupled to the first auxiliary coil, and a switch means for deactivating the rectifier element, wherein the rectifier element, the second auxiliary coil, the resistance element and the switch means are connected in series with each other and in parallel with the first auxiliary coil and the capacitor, and wherein the starting device acts in cooperation with the first auxiliary coil for providing a nonzero average flux within the motor coil during a start-up phase of the motor.

2. The motor according to claim 1 wherein the switch means deactivates the starting device after the motor attains a predetermined speed.

3. The motor according to claim 1 wherein the switch means deactivates the starting device at a predetermined time.

4. The motor according to claim 1 wherein the rectifier element comprises a diode.

* * * * *